United States Patent
Niki et al.

(10) Patent No.: US 6,390,140 B2
(45) Date of Patent: May 21, 2002

(54) FLUID-IMPERMEABLE COMPOSITE HOSE

(75) Inventors: Nobuaki Niki, Inuya; Kunihiro Noba, Nagoya; Yuji Takagi, Komaki, all of (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/781,321

(22) Filed: Feb. 13, 2001

(30) Foreign Application Priority Data

Feb. 16, 2000 (JP) ........................................ 2000-043539

(51) Int. Cl.[7] ................................................ F16L 11/10
(52) U.S. Cl. ........................ 138/127; 138/138; 138/143; 138/146
(58) Field of Search ................................ 138/138, 125, 138/126, 127, 143, 146

(56) References Cited

U.S. PATENT DOCUMENTS

| | | | | |
|---|---|---|---|---|
| 3,522,413 A | * | 8/1970 | Chrow | 138/129 |
| 3,727,029 A | * | 4/1973 | Chrow | 138/138 |
| 3,917,898 A | * | 11/1975 | Ikefani et al. | 138/126 |
| 4,510,974 A | * | 4/1985 | Nafori et al. | 138/127 |
| 4,706,712 A | * | 11/1987 | Oglesby et al. | 138/125 |
| RE33,412 E | * | 10/1990 | Oglesby et al. | 138/125 |
| 5,062,456 A | * | 11/1991 | Cooke et al. | 138/127 |
| 5,985,385 A | * | 11/1999 | Gottfried | 428/34.6 |
| 6,066,377 A | * | 5/2000 | Tonyali et al. | 138/126 |
| 6,074,714 A | * | 6/2000 | Gottfried | 428/34.6 |
| 6,213,156 B1 | * | 4/2001 | Niki et al. | 138/125 |
| 6,237,641 B1 | * | 5/2001 | Niki et al. | 138/143 |

* cited by examiner

*Primary Examiner*—James Hook
(74) *Attorney, Agent, or Firm*—Jacobson Holman, PLLC

(57) ABSTRACT

A fluid-impermeable composite hose has a wall including a laminated layer formed by longitudinally lapping a laminated sheet which contains a metallic foil, or a metallic layer formed by vapor deposition. The laminated layer is bound with thread wound about it at a density not exceeding 20%, and bound to an extent forming constrictions therein if required. The thread prevents the deformation in cross section of the hose and the separation of the overlapping edge portions of the laminated sheet which might otherwise be caused by the bending resistance of the laminated sheet. The constrictions improve the flexibility of the hose.

6 Claims, 3 Drawing Sheets

FLUID-IMPERMEABLE COMPOSITE HOSE

BACKGROUND OF THE INVENTION

1. Field of the Invention

This invention relates to a fluid-impermeable composite hose. More particularly, it relates to a fluid-impermeable composite hose having a fluid-impermeable laminated layer formed of a laminated sheet containing a metallic foil, or a metallic layer formed by vapor deposition. The hose of this invention is particularly useful as a fluid-impermeable hose for transporting any of various kinds of fluids in a motor vehicle.

2. Description of the Related Art

Every hose used for transporting a refrigerant in an air-conditioning system on a motor vehicle is required to be impermeable to the refrigerant. This is particularly the case with any hose for transporting e.g. an alternative to chlorofluorocarbons, or carbon dioxide as a refrigerant in view of system maintenance, environmental protection, etc. One of the most effective approaches is a hose having a laminated wall layer containing a metallic foil, or a metallic layer formed by vapor deposition. Environmental protection also requires a fuel hose to be impermeable to fuel, and a laminated wall layer is very useful for a fuel hose, too.

It has been usual to form a laminated wall layer for a hose by longitudinal lapping or spiral winding of a tape of a laminated sheet containing a metallic foil, or a metallic layer formed by vapor deposition. Longitudinal lapping is a method in which a tape of a laminated sheet having a width large enough to encircle a hose to be made is placed in parallel to the longitudinal axis of the hose and bent into a cylindrical layer having a pair of overlapping edge portions. Spiral winding is a method in which a tape of a laminated sheet is wound in a spirally overlapping way to form a cylindrical layer.

Longitudinal lapping has a number of advantages over spiral winding, as stated below. First, a cylindrical layer can be formed more rapidly by longitudinal lapping. Then, it can be carried out in tandem with a step of rubber extrusion preceding or following it. Moreover, the overlapping edge portions formed by longitudinal lapping have a smaller length which means that a hose has a higher fluid impermeability.

A laminated sheet is, however, a multilayer structure having spring elasticity. While it does not exhibit a very high bending resistance for spiral winding, it exhibits a high bending resistance for longitudinal lapping as it has to be bent across its width. Its bending resistance tends to cause the separation of the overlapping edge portions from each other. As a result, it is likely that a hose having a layer formed by longitudinal lapping may not retain an accurately circular shape in cross section, but may have a deformed circular shape. Moreover, the separation of the overlapping edge portions joined together may result in the failure of the hose to retain its fluid impermeability. Even if an intermediate rubber layer, or a thin resin layer may be extruded about the laminated layer, its binding force is not sufficiently strong to overcome the bending resistance of the laminated sheet.

Moreover, a hose having a laminated layer formed by longitudinal lapping is less easy to bend, since the overlapping edge portions of the laminated sheet extend longitudinally of the hose. In other words, it is usually inferior in overall flexibility to any hose having a spirally wound wall layer.

SUMMARY OF THE INVENTION

It is, therefore, an object of this invention to overcome those drawbacks of any fluid-impermeable composite hose having a fluid-impermeable laminated layer formed by longitudinal lapping of a tape of a laminated sheet which are due to the high bending resistance of the overlapping edge portions of the laminated sheet, as pointed out above. It is another object of this invention to improve the overall flexibility of any such fluid-impermeable composite hose.

The inventors of this invention have found that it is effective to bind a longitudinally lapped tape of a laminated sheet by winding thread about it at a low density. The inventors have also found that it is effective to line a laminated layer with a rubber layer and rely upon its elastic deformation for causing the strong binding force of the wound thread to make constrictions in the laminated layer.

According to a first aspect of this invention, there is provided a fluid-impermeable composite hose having a wall comprising a laminated layer formed of a laminated sheet which contains a metallic foil, or a metallic layer formed by vapor deposition, wherein the laminated layer is formed by longitudinally lapping a tape of the laminated sheet, and is bound with thread wound about it at a density not exceeding 20%. The high bending resistance of the laminated sheet is effectively suppressed by the thread wound about it. Therefore, there is no deformation of the hose in its cross sectional shape. Moreover, there is no separation of the overlapping edge portions of the laminated layer which may cause the loss of the fluid impermeability of the hose.

The thread is essentially different in construction and effect from any reinforcing yarn layer formed usually on a hose. The reinforcing yarn layer is intended for improving the strength of the hose. It is formed of reinforcing yarn wound spirally or braided at a high density, even though it may lower the flexibility of the hose to some extent or other. On the other hand, the thread employed according to this invention is wound only at a density not exceeding 20%, and does not lower the flexibility of the hose. It is exclusively intended for suppressing the bending resistance of the laminated layer, and its density not exceeding 20% is sufficient for that purpose.

According to a second aspect of this invention, there is provided a rubber layer on an inner periphery of the laminated layer, and the laminated layer has constrictions formed by the thread owing to the elastic deformation of the rubber layer. The constrictions make the hose easier to bend and improve its flexibility. If the thread is wound at a high density, the constrictions do not have a sufficiently large depth to improve the flexibility of the hose effectively. The thread density not exceeding 20% is, however, low enough to ensure that the constrictions have a sufficiently large depth to improve the flexibility of the hose effectively. The constrictions are very unlikely to cause e.g. the fracture of the metallic foil in the laminated layer unless the hose is repeatedly subjected to an extremely high pressure or large displacement. Thus, the hose is particularly suitable for use as, for example, a fuel hose which is unlikely to be subjected to a high pressure or a large displacement.

According to a third aspect of this invention, the constrictions are formed by the tension of the thread and/or its dry heat contraction. These are particularly effective ways of forming the constrictions. The constrictions formed by the tension of the thread are formed when it is wound, while those formed by its dry heat contraction are formed when the hose is heated as for curing.

According to a fourth aspect of this invention, the laminated layer has a smooth outer surface not having any constriction formed by the thread. Such a laminated layer is particularly unlikely to have its metallic foil broken when the hose is repeatedly subjected to a high pressure or a large displacement, though it cannot be expected to give the hose any such improved flexibility as is given by the constrictions in the second aspect of this invention. Thus, the hose is particularly suitable for use as a refrigerant hose which is very likely to be repeatedly subjected to a high pressure, or a large displacement, especially a hose for a carbon dioxide refrigerant. The laminated layer is preferably lined with a layer of a resin, or any other hard material which is not easily deformable, while the thread is preferably of a material having only a low degree of dry heat contraction, so that the laminated layer may retain a smooth outer surface, while the thread can bind the laminated layer strongly enough to overcome the bending resistance of its overlapping edge portions joined together.

According to a fifth aspect of this invention, the thread is preferably of polyethylene terephthalate (PET), polyamide (PA), rayon, aramid (aromatic polyamide), polyethylene naphthalate (PEN), or polyvinyl alcohol fibers.

The thread for binding the laminated layer may be of any kind, however, it is desireable to use the thread of PET, PA, rayon, aramid, PEN, or polyvihyl alcohol fibers as in the fifth aspect.

According to a sixth aspect of this invention, the laminated sheet is preferably composed of a resin film laminated on (1) a metallic foil, (2) a metallic foil and a reinforcing material, or (3) a metallic layer formed by vapor deposition. The combination of a metallic foil and a reinforcing material is particularly preferred for the laminated layer having constrictions formed therein.

The above and other features and advantages of this invention will become more apparent from the following description and the accompanying drawings.

DETAILED DESCRIPTION OF THE INVENTION

Use of Fluid-Impermeable Composite Hoses

Figure 1:
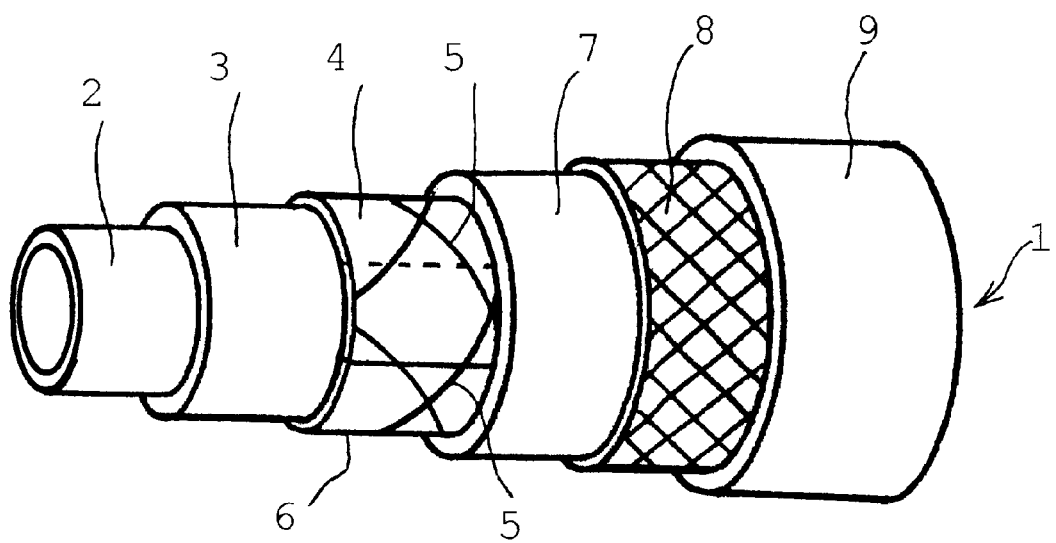
FIG. 1 is a partly cutaway perspective view of a fluid-impermeable composite hose embodying this invention.

The fluid-impermeable composite hose of this invention is useful as a hose for transporting any of various kinds of fluids. It is particularly suitable as a hose for a refrigerant or fuel, and still more suitable for use in a motor vehicle because of its flexibility to withstand any vibration of a running vehicle or its engine.

The hose according to the fourth aspect of this invention, which has no constriction in its laminated wall layer, is, for example, suitable as a hose for a carbon dioxide refrigerant because of its durability to withstand a large displacement or a repeatedly applied high pressure. The hose according to the second aspect of this invention, which has constrictions, is suitable because of its flexibility as, for example, a fuel hose which is not subjected to a very large displacement or a very high pressure.

Wall Construction of Hoses

According to an essential feature of this invention, the fluid-impermeable composite hose has in its wall a laminated layer formed by longitudinally lapping a tape of a laminated sheet and bound with thread wound about it at a density not exceeding 20%. There is no particular limitation as to any other layer of its wall, or the position of the laminated layer relative to the other layers.

There are, however, four preferred combinations of wall layers as shown at (a) to (d) below. The layers are shown sequentially from the radially innermost one.

(a) A resin layer/an intermediate rubber layer/a laminated layer/an intermediate rubber layer/a reinforcing layer/an outer rubber layer;

(b) A rubber layer/a laminated layer/an intermediate rubber layer/a reinforcing layer/an outer rubber layer;

(c) A resin layer/a laminated layer/an intermediate rubber layer/a reinforcing layer/an outer rubber layer; and (d) A resin layer/a laminated layer/a resin layer/an intermediate rubber layer/a reinforcing layer/an outer rubber layer.

Both of the hoses as shown at (a) and (b) have a rubber layer located immediately inwardly of their laminated layer. It is preferable to bind the laminated layer of each of these hoses with thread so strongly as to form constrictions in that layer, though it is alternatively possible to bind the layer with thread to the extent not forming any such constriction. The constrictions make the hose flexible enough to be suitable as, for example, a fuel hose. The hose as shown at (a) is particularly high in fuel impermeability owing to the innermost resin layer of its wall.

Both of the hoses as shown at (c) and (d) have a resin layer located immediately inwardly of their laminated layer. Each of these hoses is easy to bind with thread, while retaining a smooth outer surface on its laminated layer, since the resin layer is not easily deformable. Thus, they are suitable as highly durable hoses for transporting a refrigerant, particularly a highly permeant one, such as carbon dioxide. The hose as shown at (d) is particularly strong in the metallic foil in the laminated layer, since the layer is secured and protected between the inner and outer resin layers.

Laminated Layer

The laminated layer is formed by longitudinally lapping a tape of a laminated sheet containing a metallic foil, or a metallic layer formed by vapor deposition, and is bound with thread wound about it at a density not exceeding 20%. The thread keeps the joining portions of the laminated sheet from projecting radially outwardly and thereby holds the hose substantially circular in cross section.

The laminated sheet applied by longitudinal lapping preferably has a pair of widthwise edge portions overlapping each other to some extent. The overlapping edge portions are preferably joined to each other with an adhesive or a layer of an adhesive material, or by fusion under heat.

The thread can be wound in any way if it can bind the laminated layer effectively. For example, a single thread may be wound spirally. Two or more threads may be wound spirally in the same direction. Two threads may be wound spirally in the opposite directions in which they cross each other. Two or more sets of two or more threads each may be wound spirally in the opposite directions. The thread (or threads) is preferably bonded to the laminated layer by any appropriate method, but may not be bonded. The thread may be of any thickness and material if it is sufficiently high in tensile strength and durability to exert a satisfactory binding force on the laminated layer. For example, however, it is suitable to use a thread having a thickness of, say, 100 to 3000 deniers and a tensile strength of, say, 5 to 500 N.

Referring to the binding force of the thread, it may be at least large enough to keep the overlapping edge portions of the laminated sheet from projecting radially outwardly of the hose according to the fourth aspect of this invention. As regards the hose according to the second aspect of this invention, the force may be at least large enough to form constrictions in the laminated layer. The force cannot be expressed by any specific numerical value, since it depends on the hardness of the laminated sheet, the diameter of the laminated layer, the softness of the rubber layer in the hose according to the second aspect of this invention, etc.

The thread may be of any material including PET, PA, rayon, aramid, PEN and polyvinyl alcohol fibers. It is, however, preferably of PET or PA fibers having a relatively high degree of heat contractibility to form constrictions in the laminated layer, or of aramid fibers having a relatively low degree of heat contractibility to maintain a smooth outer surface on the laminated layer.

The magnitude (or depth) of the constrictions to be formed in the laminated layer depends on the flexibility required of the hose. Therefore, it cannot be defined by any specific numerical value. They are, however, preferably of a depth formed by the thread slightly cutting into the outer surface of the laminated layer, or any greater visually recognizable depth.

Laminated Sheet

The laminated sheet forming the laminated layer is in the form of a tape containing a metallic foil, or a metallic layer formed by vapor deposition. It is preferably formed by laminating a resin film or films on (1) a metallic foil, (2) a combination of a metallic foil and a reinforcing material, or (3) a metallic layer formed by vapor deposition.

A laminated sheet containing a metallic foil, or a combination thereof with a reinforcing material is usually formed by sandwiching it between two resin films, and bonding them together adhesively or by fusion. A laminated sheet containing a metallic layer formed by vapor deposition can be formed by forming a metallic layer by vapor deposition on one side of a resin film, and bonding another resin film to that side. A laminated sheet may also be formed by forming a metallic layer by vapor deposition on one side of each of two resin films, and bonding the films together on their sides carrying the metallic layers.

The reinforcing material does not necessarily have to be bonded to the metallic foil, but can reinforce the foil more effectively if it is bonded. The reinforcing material is preferably located radially outwardly of the metallic foil. The metallic foil and its reinforcing material may or may not be bonded to the resin films.

The reinforcing material may be of any kind, but is preferably one having a high stretch resistance and a high flexibility. Preferred examples are a wire mesh and a reinforcing fabric. The reinforcing fabric may be a canvas, or nonwoven fabric formed preferably of e.g. aramid, carbon or glass fibers of low stretchability. Another preferred example is a resin film of high strength.

The thickness and hardness of the resin films, those of the laminated sheet as a whole, etc. affect the bending resistance of the laminated sheet formed by longitudinal lapping and the flexibility of the hose. The resin films may be of any resin, but are preferably of, for example, PA, PET or EVOH. These materials are also preferred because of their high stretch resistance to protect the metallic foil against fracture. The resin films preferably have a thickness not exceeding, say, 100 $\mu$m, and the laminated sheet as a whole preferably has a thickness not exceeding, say, 300 $\mu$m.

Thin Resin Layer

A resin layer in the form of a thin film may be formed inwardly of the laminated layer, or outwardly thereof, too. The resin layer formed inwardly of the laminated layer enables it to retain a smooth outer surface despite the thread wound about it and also improves the impermeability of the hose to a refrigerant, etc. The resin layers formed both inwardly and outwardly secure and protect the laminated layer in a sandwiched manner, as well as improve the fluid impermeability of the hose. The resin layer (or layers) is preferably of, for example, EVOH, PA or a mixture of PA and a modified polyolefin, and has a thickness not exceeding, say, 300 $\mu$m.

Intermediate Rubber Layer

The intermediate rubber layer (or layers) provided in the predetermined portion at the fluid-impermeable composite hose serves to reduce or absorb any bending or deforming force acting upon the hose, so that no such force may reach the laminated layer and cause the metallic foil to break. The intermediate rubber layer is preferably of a rubber material which is highly impermeable to a refrigerant, etc., flexible, and easy to bond at a high temperature to the laminated, or reinforcing layer. Preferred examples are butyl rubber (IIR), halogenated IIR, ethylene-propylene rubber (EPM), ethylene-propylene-diene rubber (EPDM) and nitrile rubber (NBR). It preferably has a thickness of, say, 0.2 to 2.0 mm.

Reinforcing Layer

The hose preferably has a reinforcing layer in its wall. The reinforcing layer may, for example, be a braided wire layer, or a layer formed by braiding reinforcing yarn, or winding reinforcing yarn spirally, or in two spiral layers extending in the opposite directions, or placing an intermediate rubber layer between two such spiral layers.

Outer Rubber Layer

An outer rubber layer may form the outermost wall layer of the hose. It may be of any rubber of high weatherability, such as chloroprene rubber (CR), IIR, chlorosulfonated polyethylene rubber (CSM), EPDM or epichlorohydrin rubber (ECO).

DESCRIPTION OF THE PREFERRED EMBODIMENTS

Description will now be made of a few preferred embodiments of this invention with reference to the drawings. Referring first to FIG. 1, a fuel hose 1 has a resin layer 2 as the innermost layer of its wall and a first intermediate rubber layer 3 formed about it from IIR. The intermediate rubber layer 3 is surrounded by a laminated layer 6 formed by longitudinally lapping a tape of a laminated sheet 4 and bound with two threads 5 wound about it spirally in the opposite directions. The threads 5 bind the laminated layer 6 to an extent forming therein constrictions having a certain depth, but not shown. The laminated layer 6 is surrounded by a second intermediate rubber layer 7 of IIR, then a reinforcing layer 8 formed by braiding an appropriate reinforcing yarn, and finally an outer rubber layer 9 of EPDM.

Figure 2:
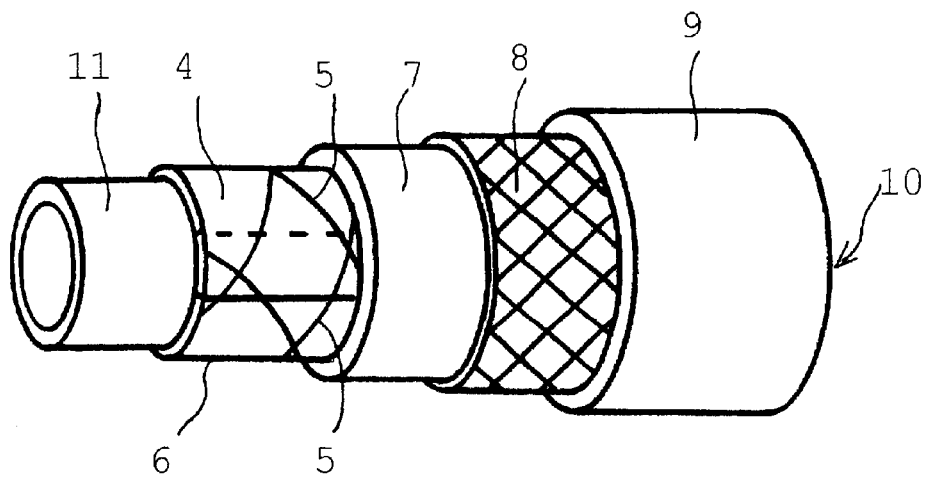
FIG. 2 is a partly cutaway perspective view of another example of a fluid-impermeable composite hose embodying this invention.

FIG. 2 shows a fuel hose 10 having an inner rubber layer 11 formed from fluororubber (FKM), and surrounded by a laminated layer 6 formed as described above, an intermediate rubber layer 7 of NBR, a reinforcing layer 8 and an outer rubber layer 9 of ECO.

Figure 3:
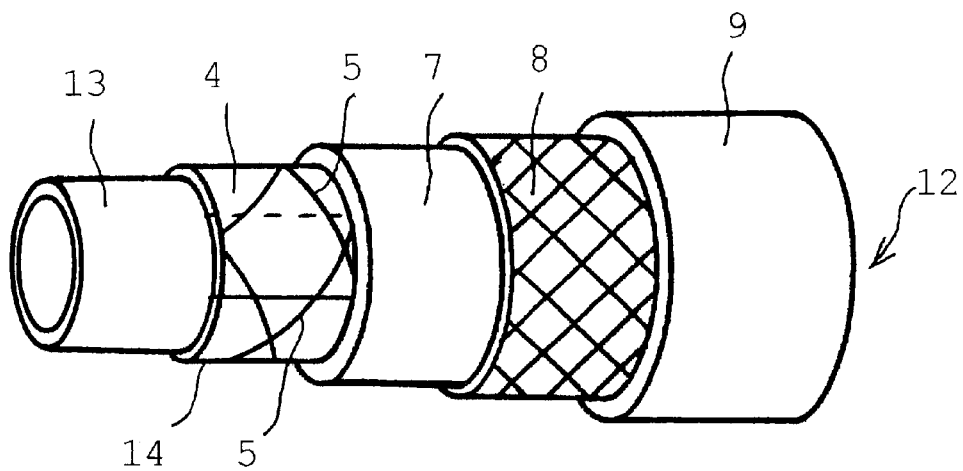
FIG. 3 is a partly cutaway perspective view of still another example of a fluid-impermeable composite hose embodying this invention.

FIG. 3 shows a hose 12 for a carbon dioxide refrigerant having, outwardly of an inner resin layer 13 formed from a PA resin, a laminated layer 14 formed by longitudinal lapping of a tape of laminated sheet 4 and bound with threads 5 to an extent not forming any constriction therein, and allowing the layer 14 to retain a smooth outer surface. The laminated layer 14 is surrounded by an intermediate rubber layer 7 of IIR, then a reinforcing layer 8 and finally an outer rubber layer 9 of EPDM.

Figure 4A:
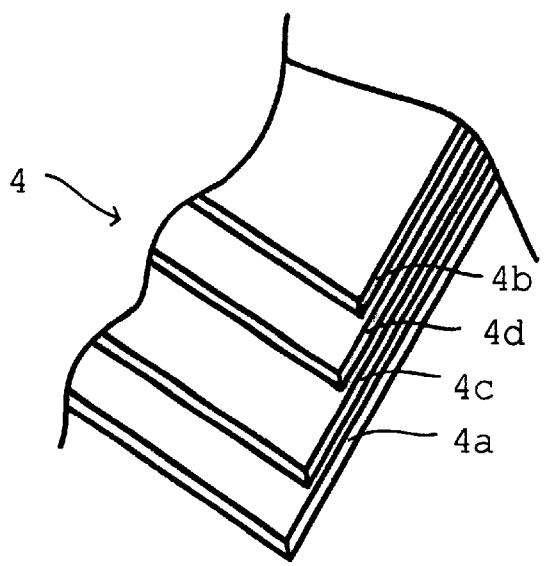
FIG. 4A is a partly cutaway perspective view of a part of a laminated sheet.
Figure 4B:
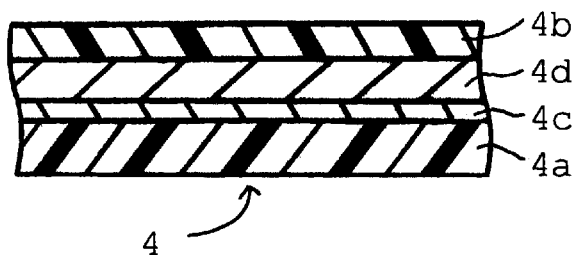
FIG. 4B is a cross-sectional view of the laminated sheet shown in FIG. 4A.

The laminated sheet 4 is as shown in FIGS. 4A and 4B. It has an inner resin layer 4a formed by a thin film of a thermoplastic PET resin, a similar outer resin layer 4b, an aluminum foil 4c and a reinforcing material 4d in the form of a resin sheet, the foil 4c and the reinforcing material 4d being sandwiched between the inner and outer resin layers. The resin layers 4a and 4b are greater in width than the foil 4c and the reinforcing material 4d, and are joined to each other along their lateral edges. The foil 4c is bonded to the reinforcing material 4d with an adhesive not shown, so that no tensile or like force acting upon the laminated sheet 4 may act upon the foil 4c held by the reinforcing material 4d.

Figure 4C:
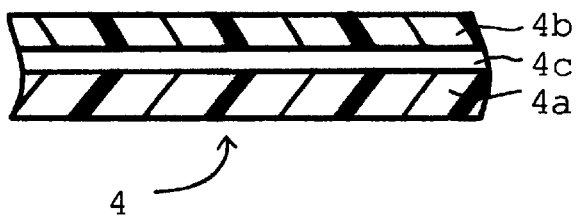
FIG. 4C is a view similar to FIG. 4B, but showing another example of a laminated sheet.

FIG. 4C shows a modified form of laminated sheet 4. It does not have any reinforcing material as shown at 4d above, but has only a metallic foil 4c sandwiched between two resin layers 4a and 4b.

While the invention has been described by way of its preferred embodiments, it is to be understood that variations or modifications may be easily made by those skilled in the art without departing from the scope of this invention which is defined by the appended claims.

What is claimed is:

1. A fluid-impermeable composite hose having a wall comprising a laminated layer formed of a laminated sheet which contains a metallic foil, or a metallic layer formed by vapor deposition, wherein the laminated layer a) is formed by longitudinally lapping a tape of the laminated sheet, b) is bound with thread wound about it at a density not exceeding 20%, c) is lined with a rubber layer and d) has constrictions formed by the thread owing to the elastic deformation of the rubber layer; and wherein the wall sequentially comprises either a resin layer as its innermost layer, a first intermediate rubber layer, the laminated layer, a second intermediate rubber layer, a reinforcing layer and an outer rubber layer as its outermost layer or an inner rubber layer as its innermost layer, the laminated layer, an intermediate rubber layer, a reinforcing layer and an outer rubber layer as its outermost layer.

2. A fluid-impermeable composite hose according to claim 1 wherein the wall sequentially comprises a resin layer as its innermost layer, a first intermediate rubber layer, the laminated layer, a second intermediate rubber layer, a reinforcing layer and an outer rubber layer as its outermost layer.

3. A fluid-impermeable composite hose according to claim 1 wherein the wall sequentially comprises an inner rubber layer as its innermost layer, the laminated layer, an intermediate rubber layer, a reinforcing layer and an outer rubber layer as its outermost layer.

4. A fluid-impermeable composite hose having a wall comprising a laminated layer formed of a laminated sheet which contains a metallic foil, or a metallic layer formed by vapor deposition, wherein the laminated layer a) is formed by longitudinally lapping a tape of the laminated sheet, and b) is bound with thread wound about it at a density not exceeding 20% while retaining a smooth outer surface thereof; and the wall sequentially comprises either a resin layer as its innermost layer, the laminated layer, an intermediate rubber layer, a reinforcing layer and an outer rubber layer as its outermost layer, or a resin layer as its innermost layer, the laminated layer, another resin layer, an intermediate rubber layer, a reinforcing layer and an outer rubber layer as its outermost layer.

5. A fluid-impermeable composite hose according to claim 4 having a wall comprising a laminated layer formed of a laminated sheet which contains a metallic foil, or a metallic layer formed by vapor deposition, wherein the laminated layer a) is formed by longitudinally lapping a tape of the laminated sheet, and b) is bound with thread wound about it at a density not exceeding 20% while retaining a smooth outer surface thereof; and the wall sequentially comprises a resin layer as its innermost layer, the laminated layer, an intermediate rubber layer, a reinforcing layer and an outer rubber layer as its outermost layer.

6. A fluid-impermeable composite hose according to claim 4 having a wall comprising a laminated layer formed of a laminated sheet which contains a metallic foil, or a metallic layer formed by vapor deposition, wherein the laminated layer a) is formed by longitudinally lapping a tape of the laminated sheet, and b) is bound with thread wound about it at a density not exceeding 20% while retaining a smooth outer surface thereof; and the wall sequentially comprises a resin layer as its innermost layer, the laminated layer, another resin layer, an intermediate rubber layer, a reinforcing layer and an outer rubber layer as its outermost layer.

* * * * *